No. 746,531. PATENTED DEC. 8, 1903.
W. J. LATCHFORD.
MACHINE FOR PREPARING FRUIT FOR CANNING.
APPLICATION FILED FEB. 16, 1903.
NO MODEL. 2 SHEETS—SHEET 1.
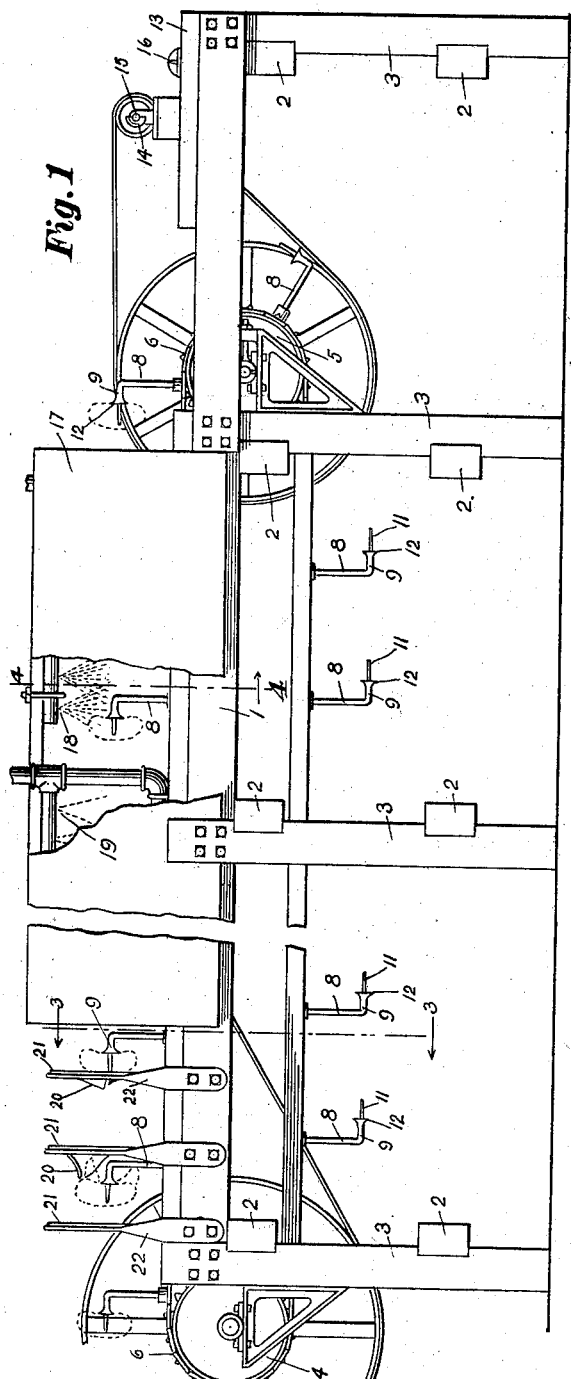
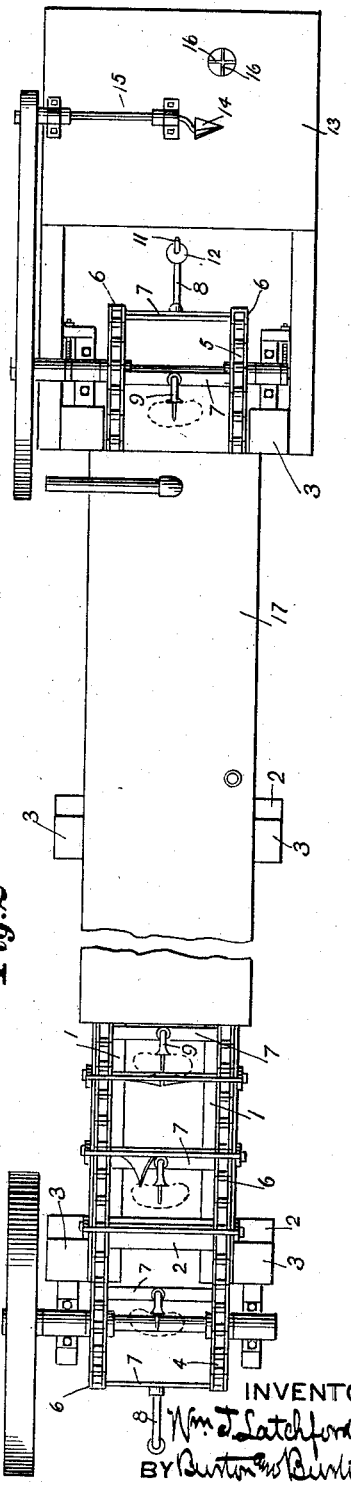
WITNESSES
M. Gertrude Ady.
Fred G. Fischer
INVENTOR
Wm. J. Latchford
BY Burton & Burton
his ATTORNEYS No. 746,531. PATENTED DEC. 8, 1903.
W. J. LATCHFORD.
MACHINE FOR PREPARING FRUIT FOR CANNING.
APPLICATION FILED FEB. 16, 1903.
NO MODEL. 2 SHEETS—SHEET 2.
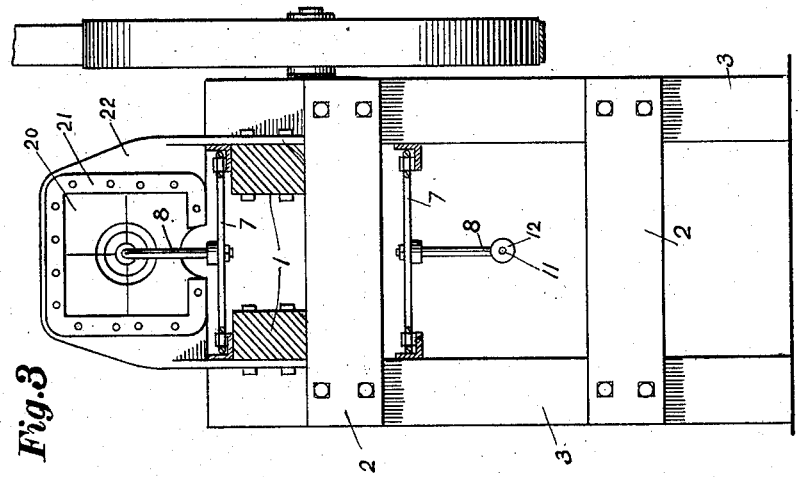
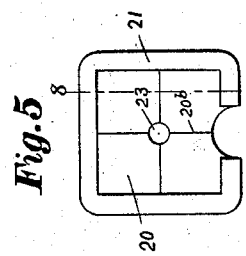
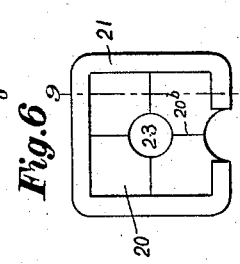
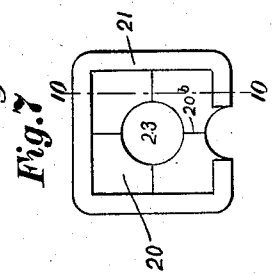
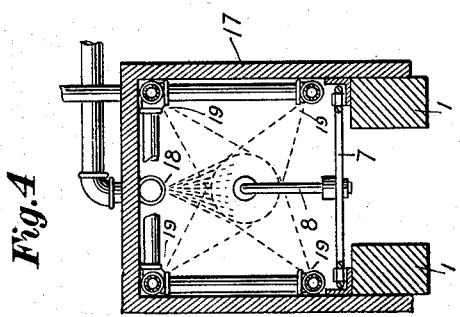
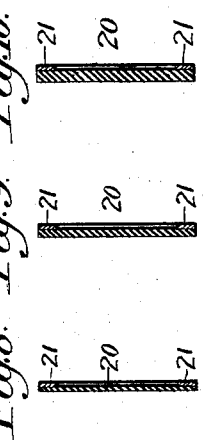
WITNESSES:
M. Gertrude Ady.
Fredr G. Fischer
INVENTOR
Wm J. Latchford
BY
Burton & Burton
his ATTORNEYS No. 746,531.　　　　　　　　　　　　　　　　　　　　Patented December 8, 1903.

UNITED STATES PATENT OFFICE.

WILLIAM J. LATCHFORD, OF VANWERT, OHIO, ASSIGNOR OF TWO-THIRDS TO ROYAL PACKING COMPANY, OF CHICAGO, ILLINOIS, A CORPORATION OF ILLINOIS.

MACHINE FOR PREPARING FRUIT FOR CANNING.

SPECIFICATION forming part of Letters Patent No. 746,531, dated December 8, 1903.

Application filed February 16, 1903. Serial No. 143,514. (No model.)

*To all whom it may concern:*

Be it known that I, WILLIAM J. LATCHFORD, a citizen of the United States, residing at Vanwert, in the county of Van Wert and State of Ohio, have invented new and useful Improvements in Machines for Preparing Fruit for Canning, of which the following is a specification, reference being had to the accompanying drawings, forming a part thereof.

The purpose of this invention is to provide an improved apparatus for handling fruit, particularly such as tomatoes, through the steps preparatory to canning, performing automatically the process of removing the skin. It consists in the features of construction set out in the claims.

In the drawings, Figure 1 is a front elevation of my machine for the purpose stated. Fig. 2 is a plan view. Fig. 3 is a section at the line 3 3 on Fig. 1. Fig. 4 is a detail section at the line 4 4 on Fig. 1. Fig. 5 is a detail of a rubber wiper-disk for stripping back the skin of the fruit. Fig. 6 is a figure similar to Fig. 5, showing a rubber disk having a central aperture larger than that of the wiper shown in Fig. 5. Fig. 7 is a figure similar to Fig. 5, showing a rubber wiper-disk having a central aperture larger than those shown in Figs. 5 and 6. Fig. 8 is a section at the line 8 8 on Fig. 5. Fig. 9 is a section at the line 9 9 on Fig. 6. Fig. 10 is a section at the line 10 10 on Fig. 7.

My improved machine for the purpose stated comprises a device for removing what are called the "cores," consisting of the hard portion around the stem end, and a device for slitting the skin into quarter-sections by two transverse cuts at the surface opposite the stem end of the fruit, and following these devices an endless carrier on which are carried stems or fingers for holding the fruit to be treated and a succession of devices operating upon the fruit as it is carried through the machine by such carrier, said devices being, first, a succession of water-jets for cleansing the fruit; second, a succession of steam-jets arranged in position to discharge steam upon the fruit within a closed chamber for loosening the skin; third, flexible wipers for stripping back the skin. After passing the wipers the skin, which has been peeled back from the side at which it was slit and remains adherent only at the base around the aperture from which the core has been removed, is grasped by one hand of the operator, while with the other hand the fruit is withdrawn from the holder, thus completing the stripping and discharging the fruit, which can be done without interrupting the travel of the carrier, whose movement is comparatively slow.

In detail the mechanism above outlined comprises a frame consisting of longitudinal parallel side bars 1 1, framed together by cross-bars 2 2 and provided with suitable standards or legs 3 3, and on this frame driving and carrying wheels 4 5 for an endless carrier, which comprises the parallel chains 6 6, connected at intervals by flights or cross-bars 7 7 7, &c., on which are mounted rigidly the fruit-standards 8 8, having at their upper ends arms 9 9, turned forwardly with respect to the direction of travel of the chain, said arms having a reduced portion or pin 11 at the forward end extending back to a shoulder 12 and adapted to be thrust into the fruit to engage the latter, which is stopped against said shoulder. At the right-hand end of the frame of the machine it has a covered portion constituting a small table 13, above which there is mounted in suitable bearings and provided with means hereinafter described for rotating a corer 14, which consists of a hollow half-cone having an axial stem 15, constituting a shaft by means of which it is journaled for rotation, and on the table, conveniently located with respect to the corer, there is mounted a device for slitting the skin in quarter-sections, consisting of two blades 16 16, mounted rigidly at right angles in the table and projecting up only a sufficient distance so that the operator by pressing the fruit quickly upon the upstanding edges of the knives will produce the desired quartering-slits in the skin, after which the skin, being thrust against the rotating corer 14, is cleared of the hard center at the base, called the "core." The operator then applies the fruit on the pin of the fruit-standard, which is next carried by on the upper flight of the chain, by which it is carried onward through the box 17, which incloses the nozzles 18, by which the water is discharged onto the fruit to cleanse it thoroughly, after which it passes by the steam-discharge nozzles 19, which are adjusted to direct jets of steam upon the periphery of the fruit at several points in the circumference, preferably substantially at right angles to the axis of the pins on which the fruit is carried, so that the tendency to free the fruit from the pin shall be as little as possible, and at the same time the discharge may be in position to reach the more firmly adherent portion of the skin at the base of the fruit. After passing through the box 17 and emerging therefrom at the farther end, the skin being thoroughly loosened by the steam, each piece of fruit is carried on the pin 11 through the wiper 20. This wiper consists of a disk of sheet-rubber or like elastically-flexible material mounted by its edges on a frame 21, which is supported fixedly on the arches 22, which are secured on the side bars 1 1 transversely with respect to the travel of the carrier. The rubber wiper-disk has an aperture 23 at the center and is slit back from said aperture radially with respect thereto, one of the slits being directly downward at the middle and others preferably in positions to cut the disk into four quarters, each constituting a flap free at the edge next to the aperture. The first-mentioned slit 20$^b$, extending downward from the hole 23, is in the path of the fruit-standards as they are carried by the carrier, and the aperture is in the path of the fruit carried on the pin 11, so that as each piece of fruit reaches the wiper the quartered and loosened skin is engaged by the flaps as they yield, while the fruit is forced through the slit rubber sheet and the skin is stripped back as it might be by human hands handling the fruit. I employ any convenient or necessary number of these wipers in succession along the path of the carrier, the apertures 23 being preferably successively smaller and smaller as the fruit advances, the aperture in the first wiper being from three to four inches in diameter, the next an inch smaller, and the last one quite small, not larger, in any event, than the diameter of the shoulder or larger portion of the pin 11. This gradation in size of the apertures causes the flaps of the first wiper to engage the skin near the outer circumference of the larger tomatoes and strip it back past the point of greatest diameter and as much farther down on the rear side as the inner edges of the flaps will reach. The next wiper will perform the same function for smaller tomatoes and will engage the skin which the first wipers have stripped back from larger tomatoes and strip it still farther back on the rear side, and the last wiper, which is preferably made of thinner more flexible sheet-rubber, will open to admit the peeled fruit and will close together behind it and engage the skin and strip it back close over the base of the arm 9, so that in the finishing action the operator merely grasps the skin as it envelops the base of the spindle and holds it thereon with the right hand while the fruit is removed with the left and then readily strips it off from the pin 11, leaving the latter clean for the next operation.

The efficiency of the flaps of the wiper for the purpose for which they are provided, as above described, is increased by having their attachment not in the line at which they would most easily fold back upon encountering the fruit, but at a line, whether curved or angular, which is concave toward the center or path of the fruit, because when thus attached the encounter with the fruit tends not only to fold them back, but also to buckle or "belly" them at the middle of the width—that is, along a line from the most recessed or remote point of their attachment toward the center, and this somewhat stiffens them against the folding in the other direction and causes them to press more effectively upon the fruit as they fold back for the purpose of engaging the skin. I have therefore shown the frames to which the flaps are attached as square, each flap being attached at the outer end along two sides of the square.

In my application for a machine for a similar purpose, Serial No. 139,735, filed January 20, 1903, I have shown a carrier for holding and carrying the fruit, means for steaming the fruit to loosen the skin, means consisting of wipers for engaging and stripping back the skin, and cutters for slitting the skin of the fruit and have broadly claimed said elements in their several combinations, and I do not in this case, therefore, claim the same thus broadly.

I claim—

1. An apparatus for the purpose indicated, comprising a carrier for holding and carrying the fruit, and a wiper located in the path of the fruit as it is thus carried, consisting of flaps of flexible rubber fabric of such width as to substantially occlude the passage for the fruit, and secured fixedly at their ends more remote from the fruit, and extending transversely to the direction of travel of the carrier, and having their other ends in position to be encountered by the fruit and to yield as the fruit is forced past it.

2. An apparatus for the purpose indicated, comprising means for carrying the fruit, and means located on the path of the fruit as it is thus carried for stripping the skin therefrom, consisting of a disk or sheet of elastically-flexible material apertured in the direct path of the center of the fruit, and slit back from such aperture to form flaps for wiping and dragging upon the surface of the fruit as the latter passes through the aperture.

3. An apparatus for the purpose indicated, comprising means for advancing the fruit along a definite path; a plurality of wipers located successively along such path for stripping the skin from the fruit, consisting each of a disk of elastically-flexible material apertured in the path of the center of the fruit, and slit back from said aperture to form flaps adapted to yield and drag back upon the fruit on all sides as it passes through such wipers.

4. An apparatus for the purpose indicated, comprising a carrier having means at intervals for holding the fruit; means for steaming the fruit to loosen the skin, located along the path of the fruit as it is advanced by the carrier, and wipers also located in said path beyond the steaming devices for stripping back the skin, consisting of elastically-flexible flaps secured at one end, and at the other end extending in the path of the fruit, and adapted, upon encounter therewith, to yield back and drag upon the fruit as the latter passes.

5. An apparatus for the purpose indicated, comprising an endless carrier having at intervals bars or flights, each carrying a fruit-standard provided with a fruit-holding pin projecting forward in the path of travel; means for slitting the skin into sections, located adjacent to the carrier at one end; a steaming apparatus located along the path of the carrier next following the location of the slitting devices, consisting of a chamber having steam-jets discharging therein upon the fruit as it is carried therethrough by the carrier, and wipers located along the path of the carrier beyond the steaming apparatus for stripping the skin from the steamed fruit, consisting of elastically-yielding flaps secured at one end, and at the other end extending in the path of the fruit, whereby it is adapted, upon encounter therewith, to yield and drag back over the fruit to frictionally engage and strip back the skin.

6. An apparatus for the purpose indicated, comprising an endless carrier and horizontally-journaled wheels by which it is operated, said carrier having means at intervals for holding the fruit; devices located along the upper flight of the carrier in the path of the fruit for steaming the same to loosen the skin, and wipers beyond the steaming devices consisting of elastically-yielding flaps secured at one end and at the other end extending in the path of the fruit, whereby it is adapted, upon encounter therewith, to yield back over the fruit for frictionally engaging and stripping the skin.

7. An apparatus for the purpose indicated, comprising a carrier for holding and carrying the fruit, and a plurality of wipers located successively in the path of the fruit as it is thus carried, each consisting of elastically-flexible flaps secured fixedly at one end, and having the other end in position to be encountered by the fruit and to yield as the fruit is forced past it for stripping the skin back by frictional engagement therewith, the said wipers having their respective flaps successively obtruded farther and farther from the center of the path of the fruit, whereby the wipers successively strip the skin back farther and farther toward the center on the rear side.

8. An apparatus for the purpose indicated, comprising a carrier having pins projecting forwardly in the path of travel for holding and carrying the fruit; a plurality of wipers located successively in the path of the fruit as it is thus carried, consisting each of elastically-flexible flaps secured fixedly at one end, and having the other end in position to be encountered by the fruit and to yield as the fruit is forced past it for stripping the skin back by frictional engagement therewith, the last of said wipers having its flaps made of more flexible material than the preceding, and extended toward the center far enough to wipe the base of the pin.

9. An apparatus for the purpose indicated, comprising a carrier for holding and carrying the fruit, and a wiper located in the path of the fruit as it is thus carried, consisting of elastically-flexible flaps having one end protruding in the path of the fruit, and the other end more remote from said path secured fixedly at a line which is concave toward said path.

10. An apparatus for the purpose indicated, comprising a carrier for holding and carrying the fruit, and wipers located in the path of the fruit as it is thus carried, consisting of disks of elastically-flexible material apertured at the center in the path of the fruit, and slit back radially from said aperture to divide it into flaps; an angular frame to which such disks are secured at their periphery, each subdivision or flap having attachment to the aperture at two sides about an angle thereof.

In testimony whereof I have hereunto set my hand, in the presence of two witnesses, at Chicago, Illinois, this 10th day of February, A. D. 1903.

WILLIAM J. LATCHFORD.

In presence of—
CHAS. S. BURTON,
FRED. G. FISCHER.